United States Patent [19]

Pritschow

[11] 3,826,131
[45] July 30, 1974

[54] DEVICE FOR MEASURING A DEFINED FORCE COMPONENT

[75] Inventor: Günter Pritschow, Berlin, Germany

[73] Assignee: Licentia Patent-Verwaltungs-GmbH, Frankfurt, Germany

[22] Filed: Oct. 2, 1972

[21] Appl. No.: 294,098

[30] Foreign Application Priority Data
Sept. 30, 1971 Germany............................ 2149438

[52] U.S. Cl............ 73/141 A, 73/88.5 R, 73/133 R
[51] Int. Cl............................................. G01l 1/22
[58] Field of Search. 73/133 R, 140, 141 A, 88.5 R, 73/104, 78; 338/5; 177/211

[56] References Cited
UNITED STATES PATENTS

| | | | |
|---|---|---|---|
| 2,488,347 | 11/1949 | Thurston................................. | 338/5 |
| 2,503,304 | 4/1950 | Stainback.......................... | 73/141 A |
| 2,513,295 | 7/1950 | Elsenberg..................... | 73/88.5 R X |
| 2,815,480 | 12/1957 | Ruge............................. | 73/88.5 R X |
| 3,358,257 | 12/1967 | Painter et al. ................. | 73/141 A X |
| 3,520,182 | 7/1970 | Kelk et al. .......................... | 73/141 A |
| 3,601,209 | 8/1971 | Paelian .......................... | 73/141 A X |
| 3,636,760 | 1/1972 | Shoberg............................. | 73/141 A |
| 3,640,130 | 2/1972 | Spescha et al. ................... | 73/133 R |

Primary Examiner—Charles A. Duehl
Attorney, Agent, or Firm—Spencer & Kaye

[57] ABSTRACT

A defined component of the force acting on a body is measured by wire strain gauges located in the path of the force component and providing the input for a bridge circuit. The strain gauges are located on a member which fits between the elements which create the force. This member also includes a region which is isolated from the force and which carries a device subjected to the same temperature as the strain gauges and connected in the bridge circuit to act as a temperature compensator which compensates for temperature variations experienced by the wire strain gauges.

2 Claims, 4 Drawing Figures

PATENTED JUL 30 1974    3,826,131
FIG./
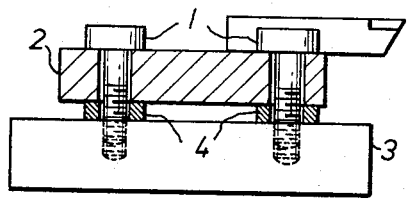
FIG.2
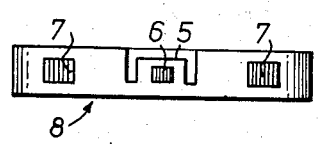
FIG.3
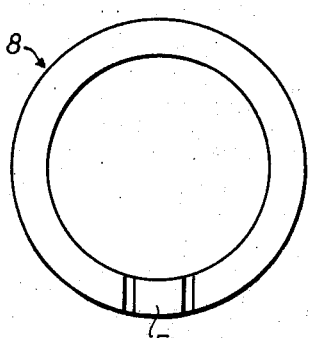
FIG.4
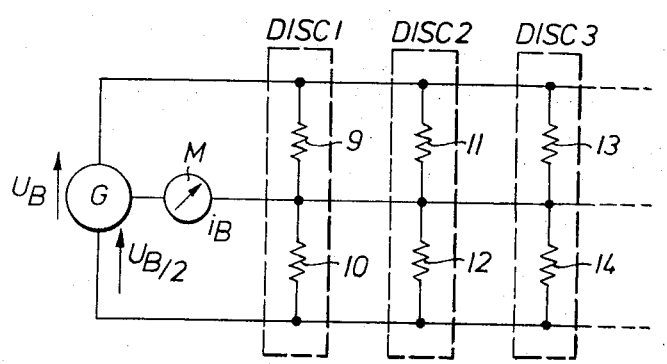

DEVICE FOR MEASURING A DEFINED FORCE COMPONENT

BACKGROUND OF THE INVENTION

The present invention relates to a method for measuring a defined component of a force acting on a body.

Sensors for measuring different values in machine tools are utilized for supplying information needed by the control circuits. For production purposes, these sensors must be designed so that they require very little maintenance and operate independent of manufacturing conditions. Especially in the utilization of sensors for determining cutting power, only a few methods of sensing are known which will meet these requirements. These methods, however, are generally of rather low sensitivity and accuracy.

One known method of measuring the cutting power of the tool during lathe operations is illustrated in FIG. 1. The fastening screws 1 of a tool holder 2 are provided with a cross slide 3 which acts as the measuring value receiver. The screws are provided with wire strain gauges. In this embodiment all of the forces through the screws are summed and indicated with the assistance of electrical circuits. In order to be able to define the cutting power to be measured, the entire flow of forces must be directed through the screws. This is possible only when the cross slide 3 and the tool holder 2 have no large areas of contact, but rather are connected via spacers 4 which can be the washers used for fastening screws 1.

The sensitivity of this measuring arrangement, however, is very low since the rigidity of the tool holder 2 compared to spacers 4 is considerably high so that the spacers 4 will become deformed and thus form a mechanical support for the fastening screws 1, particularly since the ratio of the screw length to the washer length directly influences the relative change in length of the fastening screws 1.

SUMMARY OF THE INVENTION

An object of the present invention is to provide a method for measuring a defined component of a force acting on a body.

Another object of this invention is to measure this force with great sensitivity and accuracy.

According to the present invention this is accomplished by placing the body on at least two supporting discs having an undefined expansion behavior. The discs contain at least one active wire strain gauge. A force-insulating zone is formed as part of the disc to serve for temperature compensation. The changes in current produced at the wire strain gauges are measured by use of a bridge arrangement in the measuring instrument.

The present invention provides a method by which forces along their directional axis can be analyzed. This method is particularly suited for measuring the main cutting force in lathing operations, independent of the length of the tool or the position of the tool, as an actual value for an adaptive control instrument.

BRIEF DESCRIPTION OF THE DRAWINGS

FIG. 1 is a cross-sectional view of a prior art arrangement, already described above, to which the present invention can be applied.

FIG. 2 is a side view of a spacer which is used in the method of the invention.

FIG. 3 is a top view of the spacer of FIG. 2.

FIG. 4 is a block diagram of the circuit for measuring the force according to the present invention.

DESCRIPTION OF THE PREFERRED EMBODIMENTS

According to the present invention, as can be seen in FIGS. 2 and 3, measuring discs 8 which are provided with a wire strain gauge can be used as the spacers of FIG. 1. In order to provide greater stability for the tool holding system, the measuring discs 8 should have a high rigidity in the direction of the transmission of force, and consequently their structural height must be very small. Since these discs are not effected in the same manner as the washers in the prior art device, a greater accuracy and sensitivity in measuring the force component is obtainable. Such measuring discs, however, are not very well suited as instruments for measuring forces since the marginal influences caused by varying friction and the contact zone areas strongly influence the measuring zone.

In particular, it is impossible to determine a zone of defined expansion for such a measuring disc.

The measuring disc 8 is provided with a zone 5 which is not effected by the force flow. As can be seen from FIG. 2, zone 5 has no force applied to it since it is recessed below the top surface of the disc 8 and effectively isolated from the region occupied by gauges 7 by two lateral cuts which substantially completely prevent vertical forces on the region of gauges 7 from being transmitted to zone 5. The participating wire strain gauges are affected by variations in temperature. Therefore a temperature compensating strip 6 is added in the neutral area 5. This temperature compensator strip is affected by temperature variations to the same extent as the strain gauge 7 and therefore balances out any temperature effects when it is utilized in the bridge circuits. If the measuring disc is designed as a ring, then in the remaining periphery of the ring one or more wire strain gauges 7 are attached for determining the compressional force.

Since a plurality of measuring discs take part in the determination of the flow of forces, all of forces must be summed in an electrical evaluation circuit. This is done as shown in the bridge circuit of FIG. 4. The bridge circuit includes a plurality of discs, voltage source G and current meter M. With conventional measuring bridges, the transverse bridge voltage is amplified for the signal evaluation. In that case, this would mean that with the use of only one measuring disc the sensitivity would be twice as high as with a parallel connection of two measuring discs. If, for example, a measuring disc, Disc 1, with strain gauges 9 and 10, under load were connected in parallel with a second measuring disc, Disc 2, with strain gauges 11 and 12, not under load, the total resistance of the arrangement would be cut in half and thus also the ratio of the change in resistance resulting from compression to the total resistance. If further discs, such as Disc 3, with strain gauges 13 and 14 were connected the total resistance would be still further reduced.

In order to prevent this drawback a measurement is made of the transverse bridge current in which the sensitivity remains constant independent of the number of measuring discs employed.

It will be understood that the above description of the present invention is susceptible to various modifications, changes and adaptations, and the same are intended to be comprehended within the meaning and range of equivalents of the appended claims.

I claim:

1. A device for measuring a defined component of a force acting on a body, comprising: a supporting ring having opposed axial end surfaces and having a small axial dimension, said ring being oriented with its axis parallel to such component and having a first region extending between said end surfaces to support such force component and a second region having one axial end recessed below one axial end surface of said ring and partially isolated from said first region by two lateral cuts in said ring, said cuts extending axially from said one axial end surface to a point spaced from the other of said axial end surfaces, whereby said second region is isolated from the force component applied between said axial end surfaces; a strain gauge wire straingauge mounted on said ring at said first region to respond to such force component; and a second wire strain gauge mounted on said ring at said second region to be at the same temperature level as said first wire strain gauge, whereby said second gauge acts as a temperature compensator, and means connecting said first and second gauges in a measuring circuit for measuring changes in the current produced in said first wire strain gauge due to changes in the magnitude of the force component.

2. A device as defined in claim 1 for measuring the main cutting force on a cutting tool used in a lathing operation and further comprising a stationary support supporting said ring and a cutting tool holder supported by said ring, with each axial end surface of said ring bearing against a respective one of said support and said holder.

* * * * *